United States Patent
Malla

(10) Patent No.: US 7,899,829 B1
(45) Date of Patent: Mar. 1, 2011

(54) INTELLIGENT BOOKMARKS AND INFORMATION MANAGEMENT SYSTEM BASED ON SAME

(75) Inventor: Prajno Malla, San Francisco, CA (US)

(73) Assignee: Unifi Scientific Advances, Inc., Longview, TX (US)

( * ) Notice: Subject to any disclaimer, the term of this patent is extended or adjusted under 35 U.S.C. 154(b) by 975 days.

(21) Appl. No.: 11/611,071

(22) Filed: Dec. 14, 2006

Related U.S. Application Data

(60) Provisional application No. 60/750,213, filed on Dec. 14, 2005, provisional application No. 60/765,074, filed on Feb. 3, 2006.

(51) Int. Cl.
  G06F 7/00 (2006.01)
  G06F 17/30 (2006.01)
(52) U.S. Cl. .................................. 707/741
(58) Field of Classification Search .................. 707/769
  See application file for complete search history.

(56) References Cited

U.S. PATENT DOCUMENTS

| | | | |
|---|---|---|---|
| 6,643,641 B1 | 11/2003 | Snyder | |
| 7,167,901 B1 * | 1/2007 | Beadle et al. | 709/207 |
| 2001/0011285 A1 * | 8/2001 | Kanno et al. | 707/512 |
| 2002/0016786 A1 * | 2/2002 | Pitkow et al. | 707/3 |
| 2002/0078089 A1 * | 6/2002 | Bade et al. | 707/513 |
| 2003/0046290 A1 * | 3/2003 | Yamada | 707/10 |
| 2004/0139178 A1 * | 7/2004 | Mendez et al. | 709/220 |
| 2004/0205511 A1 * | 10/2004 | Best et al. | 715/501.1 |
| 2004/0205543 A1 * | 10/2004 | Awada et al. | 715/512 |
| 2005/0256867 A1 * | 11/2005 | Walther et al. | 707/5 |

OTHER PUBLICATIONS

Clipmarks—http://www.clipmarks.com/learn-more/.
Delicious—http://del.icio.us/about.
Google Notebook—http://www.google.com/googlenotebook/overview.html.

* cited by examiner

*Primary Examiner*—Luke S. Wassum
*Assistant Examiner*—Nicholas E Allen

(57) ABSTRACT

An intelligent bookmark is a collection of information, including an address (e.g., a URL) for a document (e.g., web page) or other hyper-media enabled item bundled together with selected other information. The selected other information may be manually or automatically obtained from the document, the browser history leading up to the display of the document, user entered annotations, etc. A collection of intelligent bookmarks may be sorted and searched using the selected other information. Intelligent bookmarks may be exchanged between users, and users may edit the bookmark content or in layers above the bookmark. Users may rate the bookmarks. A complete system provides for creating, storing, accessing, editing, grouping, exchanging, and searching intelligent bookmarks locally and/or remotely via a server.

18 Claims, 10 Drawing Sheets

INTELLIGENT BOOKMARKS AND INFORMATION MANAGEMENT SYSTEM BASED ON SAME

CROSS-REFERENCE TO RELATED APPLICATIONS

The present invention is related to and claims priority from copending U.S. Provisional Patent Application titled "Information Management System Based on Intelligent Bookmarks", Ser. No. 60/750,213, filed Dec. 14, 2005 which is incorporated herein by reference. The present application is also related to copending U.S. Provisional Patent Application titled "Information Management System Utilizing Intelligent History Items Based on Intelligent Bookmarks", Ser. No. 60/765,074, filed Feb. 3, 2006, which is incorporated herein by reference.

BACKGROUND OF THE INVENTION

The present invention is related to accessing the Internet, and more particularly to a method for creating and managing bookmarks which provide search and organizational elements within a bookmark database.

The Internet and World Wide Web provide a wealth of information on any subject. Most people with access to the Internet rely on it for news, stock information, research, hobbies, and other information they seek, such as matrimony and other personal issues. In terms of Internet technology, advancements in different areas of communication have grown at a rapid pace. Such advancements include e-mail, discussion boards and forums, chatting, instant messaging, voice over IP, RSS, Podcasts, etc. Hardware advancements include faster PCs, networking speeds and standards, faster ISP services, etc. Software advancement includes applications based on Flash, Java, XML, etc. Browser advancements include more security, more customization, tabbed browsing, more available plug-ins, etc. However, one area that has been overlooked is advances in bookmarks.

Since information on the internet can be constantly updated or changed, information may not always be permanently or persistently available and may be difficult to capture or store. To address this difficulty, users often capture information on the internet via screenshots. Screenshots portray an exact image of what the user is viewing. Screenshots can also be useful in capturing a snapshot of information, particularly information that may have been provided or accessed from a database. However, the screenshot may be limited to the user's display size (which is usually smaller than most articles). Screenshots do not necessarily store any searchable text and therefore are not easily searchable. Capturing information through a screenshot does not necessarily allow a user to copy/paste text from it either. Also, the saving of screenshots is not effectively integrated in the browser and thus require the user to manually manage creating an image file from the screenshot, naming it, and saving it under categorized folders for further retrieval. Further, information, saved in a screenshot may be effectively updated or changed, and the screenshot is not able to verify such updates and changes. These steps make it very cumbersome to user screenshots to capture information online, thus limiting the usefulness and effectiveness of screenshots as a tool to capture, preserve, share, and manage internet-based information and content.

Cutting and pasting text and pictures from web pages into word processing documents is another way of saving information. This method is one of the most common way users store and capture information from the internet. By cutting and pasting pictures and text, users save such information on their own computers. However, this method may destroy the formatting on the original webpage. Often, the word processor uses up computer resources (such as RAM and hard-drive space). Many cut and paste entries also copy unnecessary tables and script which makes it very difficult to have the information easily readable and useful.

Users may also choose to use the browser's "Save" functionality to save a webpage. Although this method is fairly easy, it also takes up hard-drive resources by saving every single picture of the webpage (often including unwanted advertisements and content, menus, etc) and retaining the original links by mapping them to directories on the computer. This method is resource intensive and results in the collection of vast amounts of information that may be unnecessary. Also, this "Save" functionality may not be very accurate in pages with scripts because some references in these scripts that rely on server-side processing cannot be accessed by the client side browser for later execution, resulting in missing information when saved. Since the "Save" functionality tries to retain the structure of the website, any changes the user would do to sort and organize these downloaded files/folders may potentially break the link structures of saved pages potentially "losing" important information. These factors can make the "Save" functionality a last resort due to the difficulty of organization, the inaccuracy in capturing information, and the demand in hard-drive space.

Printing is another way in which information can be captured from the internet. Printing captures information from the internet, but creates a non-digital version of the information. Printing allows for users to mark up information and file it easily and also have it accessible when not being connected to the internet. However, not having a digital copy has a lot of drawbacks in terms of being able to easily and effectively utilize the information in subsequent research and other material compilation. There are other drawbacks to printing as well. It is not always feasible to print material off the web. Printing files, that are hundreds of pages long, wastes ink and paper. Lot of portal sites and complex web pages are not very printer-friendly as well and may not be formatted to allow easy printing. Also, keeping a hard-copy of information captured online can be difficult in terms of filing and accessing for the future.

Bookmarks are a common but ineffective way to capture information online. As used herein, a bookmark is a pointer acting as a reference or navigation element to a document or to a section of or location within a document, that automatically brings the referred information to the user when the navigation element is selected. This automatic functionality is part of a browser, or other software application within which the document is being viewed. Bookmarks are not limited to HTML or the web, but may be used in almost any electronic media.

Bookmarks today have not changed much over the years as information contained in a bookmark still includes only a single line of text that holds a URL, possibly associated with the title of the bookmarked document (either extracted from the page being viewed or entered by the user). No element of nor content from the body of the document is present in the bookmark. When a bookmarked web page gets taken off-line or gets updated, the user may lose information which was meant to be captured, since revisiting the URL may return an updated page or a non-existing page error. Furthermore, websites often undergo maintenance and restructuring rendering bookmarks possibly no longer relevant or useful. Bookmarked pages are also not easily searchable, and users have to manually access each bookmarked page to search them.

Another problematic aspect about bookmarks is that when categorized, bookmarks use folders based on a very basic user interface (In the user interface, users are limited to the file and folder aspects of the underlying operating system with limited drag-and-drop functionality).

In addition, for a user to have a similar web experience on different PCs or internet-enabled devices (including wireless), it is important that users be able to utilize previously identified bookmarks. Unfortunately, bookmarks are also not easily portable. There are websites that allow you to store URLs online, but this only lets a user use the URLs without providing a common interface of bookmark features. Other shortcomings of bookmarks are with dynamically generated web-pages. Internet forms that provide receipts and pages that access data from different databases general have no static address that they can be accessed at. Without knowing, users try to capture such pages through bookmarks only to revisit those bookmarks and receive errors or the parent pages loosing valuable information. All these reasons and more make bookmarks an ineffective way to capture and utilize information available on the internet.

Since more users rely on the internet in their daily lives, it is important that they have a better ability to manage information they have gathered. It is also necessary that there are easier ways for users to utilize the information they have gathered by being able to access, search, share, rate this information and integrate this in current internet technologies.

SUMMARY OF THE INVENTION

Accordingly, the present invention provides a method for creating and managing a database of intelligent bookmarks, that provides users a better ability to manage information they have gathered by allowing users to access, search, share and rate this information. While there are a number of unique aspects to the present invention, a common theme is the intelligent bookmark. An intelligent bookmark according to the present invention is a collection of information, including an address (e.g., a URL) for a document or other hyper-media enabled item bundled together with selected other information. The selected other information may be manually or automatically obtained from the document, the browser history leading up to the display of the document, user entered annotations, etc.

For the purposes hereof, the term document is taken to mean an electronic file or similar container containing content data, formatting information, metadata (data that describe characteristics of the document to aid in its identification, discovery, assessment, and management), and possibly code capable of causing selected functionality. Examples of documents include web pages, files associated with word processing, spreadsheet, drawing and graphics, database, and presentation software, music, image, and game files, etc. Documents of the type of concern herein typically will be partitioned by tags or other means into sections, such as a title section (such as a file name), a script section (such as formatting), a metadata section (such as date of creation/modification), and a body section (such as a text section).

In a first aspect of the present invention, an intelligent bookmark is created by retrieving an address of a document, for example a web page, extracting identifier information from the document, and saving the address in conjunction with the identifier information as an intelligent bookmark. Such identifier information is obtained at least in part from the body of the document, and therefore includes more that simply the title or name associated with the address.

In some embodiments in accordance with the first aspect of the present invention, the identifier information includes the URL of the webpage, text within the webpage, non-text materials (e.g., images) and metaheaders. Portions of the non-text material may be scanned by optical character recognition to extract any text information contained therein. The identifier information may further include the parent website, date and time stamp information, search keywords used to locate the Internet webpage, user entered text and user entered preference ratings for the Internet webpage. The identifier information may further include animations or video within an Internet webpage, wherein the animations or video are recorded using a video recording tool.

In an embodiment in accordance with the first aspect of the invention, the intelligent bookmark is saved within a Web browser application. In an additional embodiment in accordance with the first aspect of the invention, the intelligent bookmark is saved onto a separate bookmark application within the user computer, and can be accessed offline. The intelligent bookmark can be imported from an offline source to an online source, such as a Web browser application or remote server. In another embodiment in accordance with the first aspect of the invention, the intelligent bookmark is saved on a remote server. The intelligent bookmark can be accessed by any user with access to the remote server.

In yet another embodiment in accordance with the first aspect of the invention, a user identification is saved in conjunction with an intelligent bookmark. The user identification is used to denote a particular user.

In a second aspect of the present invention, a database for intelligent bookmarks is created by retrieving an image of an Internet webpage, extracting identifier information from the webpage, assigning the identifier information a filing category, filing the image in conjunction with the identifier information according to the filing category, and saving the image in conjunction with the identifier information as an intelligent bookmark.

In some embodiments in accordance with the second aspect of the present invention, the identifier information includes the URL of the webpage, text within the webpage, non-text materials and metaheaders. The non-text material is scanned by optical character recognition to extract any text information contained within the non-text material. The identifier information may further include the parent website, date and time stamp information, search keywords used to locate the Internet webpage, user entered text and user entered preference ratings for the Internet webpage. The identifier information may further include animations or video within an Internet webpage, wherein the animations or video are recorded using a video recording tool.

In an embodiment in accordance with the second aspect of the present invention, the intelligent bookmark is searchable.

In other embodiments in accordance with the second aspect of the present invention, the filing category is assigned to the intelligent bookmark by requesting the user to input the filing category information, is automatically assigned to the intelligent bookmark based on the extracted identifier information or is one of a number of default filing categories, which is automatically assigned to the intelligent bookmark based on the extracted identifier information.

In an embodiment in accordance with the second aspect of the invention, the intelligent bookmark is saved within a Web browser application. In an additional embodiment in accordance with the first aspect of the invention, the intelligent bookmark is saved onto a separate bookmark application within the user computer, and can be accessed offline. The intelligent bookmark can be imported from an offline source to an online source, such as a Web browser application or remote server. In another embodiment in accordance with the first aspect of the invention, the intelligent bookmark is saved on a remote server. The intelligent bookmark can be accessed by any user with access to the remote server.

In yet another embodiment in accordance with the second aspect of the invention, a user identification is saved in conjunction with an intelligent bookmark. The user identification is used to denote a particular user.

In some embodiments in accordance with the second aspect of the invention, the intelligent bookmark is deleted from the database or archived. The intelligent bookmark will be deleted or archived if it either has not been accessed for a default period of time or if the user requests the bookmark to be deleted or archived.

In another embodiment in accordance with the second aspect of the invention, a database can be created by copying intelligent bookmarks a remote server, an offline application on a user's computer or a Web browser application to a database.

In a third aspect of the present invention, a database for intelligent bookmarks can be accessed and managed by requesting a user to enter a search term, searching the database for intelligent bookmarks containing the search term, displaying a list of intelligent bookmarks with the search term, requesting the user to select one or more intelligent bookmarks, requesting the user to select one or more bookmark actions to be performed on the intelligent bookmark, and performing a selected action on the one or more selected intelligent bookmarks.

In some embodiments in accordance with the third aspect of the invention, the search term may include keyword text, a rating, date and time information, a category or a user identification, to search for intelligent bookmarks input by a particular user.

In other embodiments in accordance with the third aspect of the invention, a bookmark action may include opening the webpage for the intelligent bookmark on a Web browser application, sending the intelligent bookmark to another location via an electronic mail application or instant message application, attaching the intelligent bookmark to an Internet Blog, exporting the intelligent bookmark to an external file, creating a bibliography based on the extracted identifier information or saving the intelligent bookmark to a bookmark community, wherein said bookmark community is accessible by multiple users.

In a fourth aspect of the present invention, users can be notified of websites and advertisements of interest to the user by creating a user profile, wherein the profile comprises identifier information from the intelligent bookmarks, ratings of the internet webpages and frequency of visits to internet webpages, evaluating the profile to denote the most popular websites for the user, and sending the user advertisements and websites that are similar to the most popular websites for the user.

In a fifth aspect of the present invention, a database for intelligent bookmarks can be created and managed from within a Web browser application by displaying an intelligent bookmark toolbar for actions related to intelligent bookmarks within a Web browser application, capturing an image of a webpage using said toolbar, extracting identifier information from the webpage, displaying identifier information and the image to user, wherein user may make changes to identifier information, assigning the identifier information a category, displaying the identifier information in conjunction with the captured image to the user as a preview, filing the image in conjunction with the identifier information according to the category, saving the image in conjunction with the identifier information as an intelligent bookmark, wherein the intelligent bookmark is not saved if an intelligent bookmark for the particular Internet webpage already exists, and creating a link to the intelligent bookmark within a pull-down menu within the intelligent bookmark toolbar, wherein the link is displayed according to the category.

In an embodiment in accordance with the fifth aspect of the invention, a user can select the sections of the Internet webpage to be captured.

In some embodiments in accordance with the fifth aspect of the present invention, the identifier information includes the URL of the webpage, text within the webpage, non-text materials and metaheaders. The non-text material is scanned by optical character recognition to extract any text information contained within the non-text material. The identifier information may further include the parent website, date and time stamp information, search keywords used to locate the Internet webpage, user entered text and user entered preference ratings for the Internet webpage. The identifier information may further include animations or video within an Internet webpage, wherein the animations or video are recorded using a video recording tool.

In other embodiments in accordance with the fifth aspect of the present invention, the filing category is assigned to the intelligent bookmark by requesting the user to input the filing category information, is automatically assigned to the intelligent bookmark based on the extracted identifier information or is one of a number of default filing categories, which is automatically assigned to the intelligent bookmark based on the extracted identifier information.

In another embodiment in accordance with the fifth aspect of the invention, the user is allowed to edit the displayed preview. The user may add or delete text or images.

Thus, according to one aspect of the present invention, a computer-implemented method for creating an intelligent bookmark to a document, the document of the type including at least an address, a title, and a body, the intelligent bookmark including at least an address of a document and identifier information about that document obtained at least in part from the body of the document, comprises displaying the document, retrieving the address of the document, extracting certain identifier information from the body of the document, and storing said address and said certain identifier information such that said address and said identifier information are associated with one another so that the document can be accessed from the address and information about the document can be obtained from the identifier information. The extraction may advantageously be automatic, without requiring specific user input. The automatically extracted information may be supplemented manually by the user. Search history, extrinsic data, and captured data may also be included with the identifying information. The method may be embodied within the memory of a computing device or as a series of steps stored on one or more computer-readable media, such as magnetic or optical disk, flash memory, etc.

According to another aspect of the present invention, a computer-implemented method of creating a user profile from a user's collection of intelligent bookmarks to documents, each such document of the type including at least an address, a title, and a body, each intelligent bookmark including at least an address of a document and identifier information about that document obtained at least in part from the body of the document, comprises determining from the user's collection of intelligent bookmarks at least one of the following for the user: categories of interest to the user; document characteristics of interest to the user; keywords of interest to the user; and document behavior of interest to the user. The method may be embodied within the memory of a computing device or as a series of steps stored on one or more computer-readable media, such as magnetic or optical disk, flash memory, etc.

According to still another aspect of the present invention, a computer server-implemented method of providing a community of users with access to intelligent bookmarks to documents, each such document of the type including at least an address, a title, and a body, comprises providing an interface to the server which allows multiple user to: create of an intelligent bookmark to a document; view an intelligent bookmark: search for an intelligent bookmark; edit an intelligent bookmark; rank an intelligent bookmark; upload an intelligent bookmark; and proving storage, in communication with said server computer, on which said intelligent bookmarks may be stored; such that each intelligent bookmark includes at least an address of a document and identifier information about that document obtained at least in part from the body of the document. The method may be embodied within the memory of a computing device or as a series of steps stored on one or more computer-readable media, such as magnetic or optical disk, flash memory, etc.

The above is a summary of merely a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

In the following description the term intelligent bookmark is used to refer to an associated collection of information, including an address (e.g., a URL) for a document (e.g., web page) or other hyper-media enabled item and selected other information (referred to herein as identifier information). Typically, the document in question is a webpage, and the description which follows assumes such is the case. However, it will be understood by one skilled in the art that the document may also be an item stored locally on a user's computer, such as a word processing, spreadsheet, or presentation document, etc. Accordingly, the following is by way of example, and not intended to be a limitation on the spirit and scope of the present invention.

Figure 1:
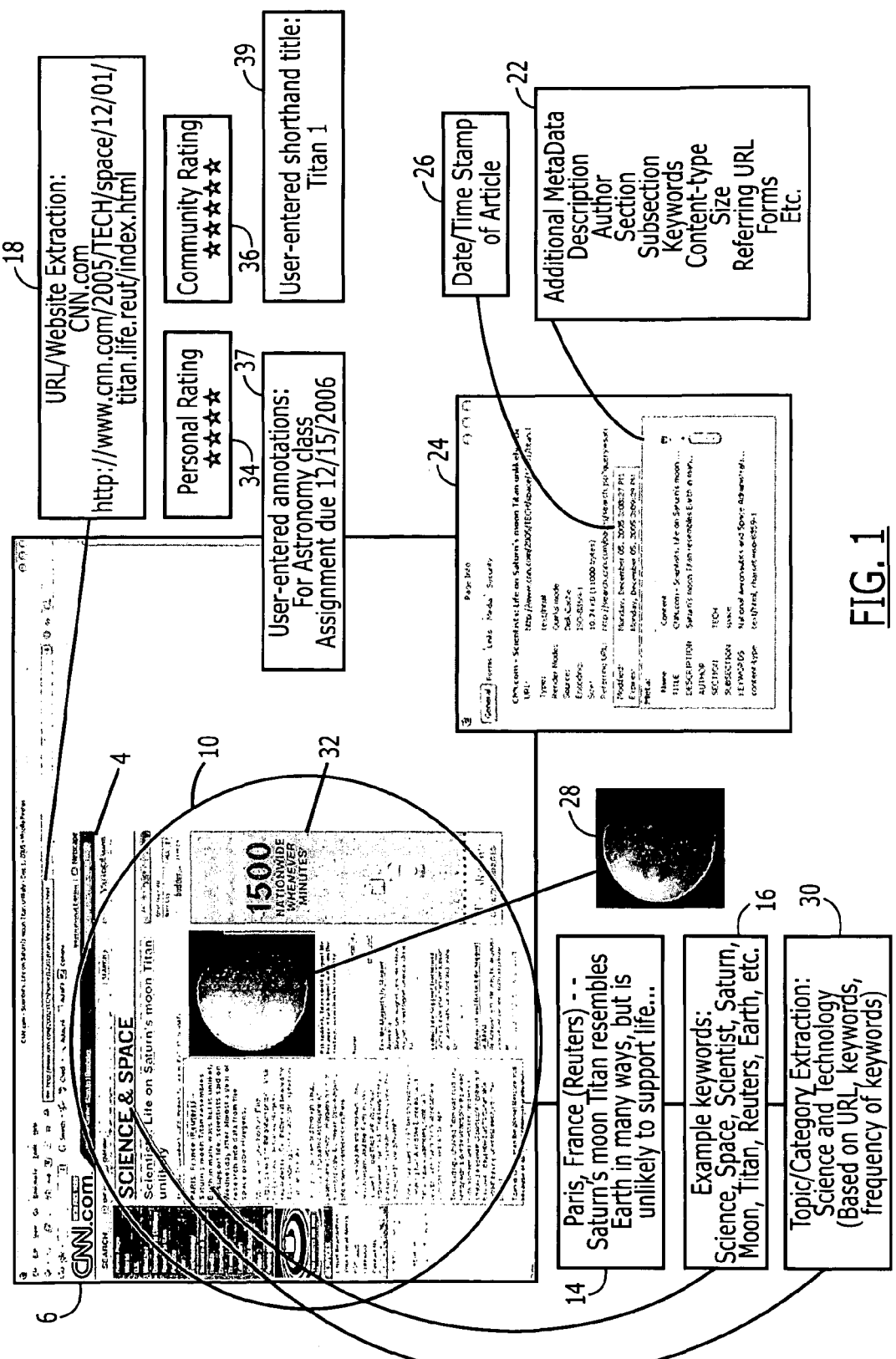
FIG. 1 is a an illustration of a number of elements of an intelligent bookmark according to an embodiment of the present invention.

FIG. 1 illustrates a sample, representative Internet webpage 4, displayed in a window 6 by a web browser application. Using a mouse, pen and tablet, or other computer interface means (not shown), a user may capture a selectable area, 10, which the user may wish to bookmark. That is, area 10 may contain information such as text, picture, audio, video, etc., which the user may wish to quickly recover (among other options which are discussed further below) at a later time. The captured area becomes the source for data which will form an intelligent bookmark according to the present invention. By default, the image captured in the process of constructing the intelligent bookmark is the whole screen the user is currently viewing (although this may be set to other selection choices by the user in appropriate applications of the present invention).

Once the page is captured, the process of creating identifier information by extracting portions of the page in the best-suited manner is initiated. For example, text and html information that can be extracted from the webpage are identified and saved at 14. Keywords 16 may be identified and extracted from text 14 or other portions of the webpage. One method for identifying relevant keywords is disclosed in U.S. Pat. No. 6,470,307 titled "Method And Apparatus For Automatically Identifying Keywords Within A Document" which is incorporated herein by reference. See also U.S. Pat. No. 5,659,730, and U.S. Pat. No. 7,082,427 for other such techniques (each of which also being incorporated herein by reference). The URL of the website 18 and the parent site 20 are extracted. Other metadata information 22, present in the webpage may also be extracted based on page metaheaders 24. For example, date and time stamp information 26 can be extracted from the metaheader 24. Images and non-textual information 28 may be identified and extracted. Based on the available information, a category or categories 30 may automatically be assigned. Further, the bookmark can also be manually categorized, and keywords can be added by the user.

Based on user-selectable preferences, the user can also choose to have images and non-textual information 28 scanned by OCR (Optical Character Recognition) to extract further text and information. Further integration can be incorporated in the intelligent bookmark to generate PDF files from the website text 14 to attach to the intelligent bookmark, if necessary. Advertisements 32 (or links thereto) can be blocked, removed, or maintained, while creating bookmarks as well. The user can manually rate the bookmark at 34 depending on his/her interest. The bookmarked site can be checked for a community rating at 36 as well, allowing for the user to further update the community rating. Other features may include capturing animation/video or other display data that dynamically changes on the screen. There are a variety of COTS products that capture screen animation/video by recording the screen. An example of screen capture and recording software is Camtasia available from TechSmith.com (http://www.techsmith.com/camtasia.asp). If the user would like to capture such information, a "record" functionality would allow a video screenshot of such information to be stored in the intelligent bookmark. This type of "record" functionality can also allow for user interaction with certain websites to be recorded and bookmarked as well.

Interface preferences allowing creation of bookmarks with some or all of the aforementioned features will be set as a function of the desired level of complexity of the intelligent bookmarks (i.e., how much information should be extracted/stored, or if special functions needed to be performed) The greater the demand on the computing resources required for a feature (e.g., applying optical character recognition to an image files is considered a moderately high demand feature) the more a user benefits from disabling that feature unless truly required.

Figure 2:
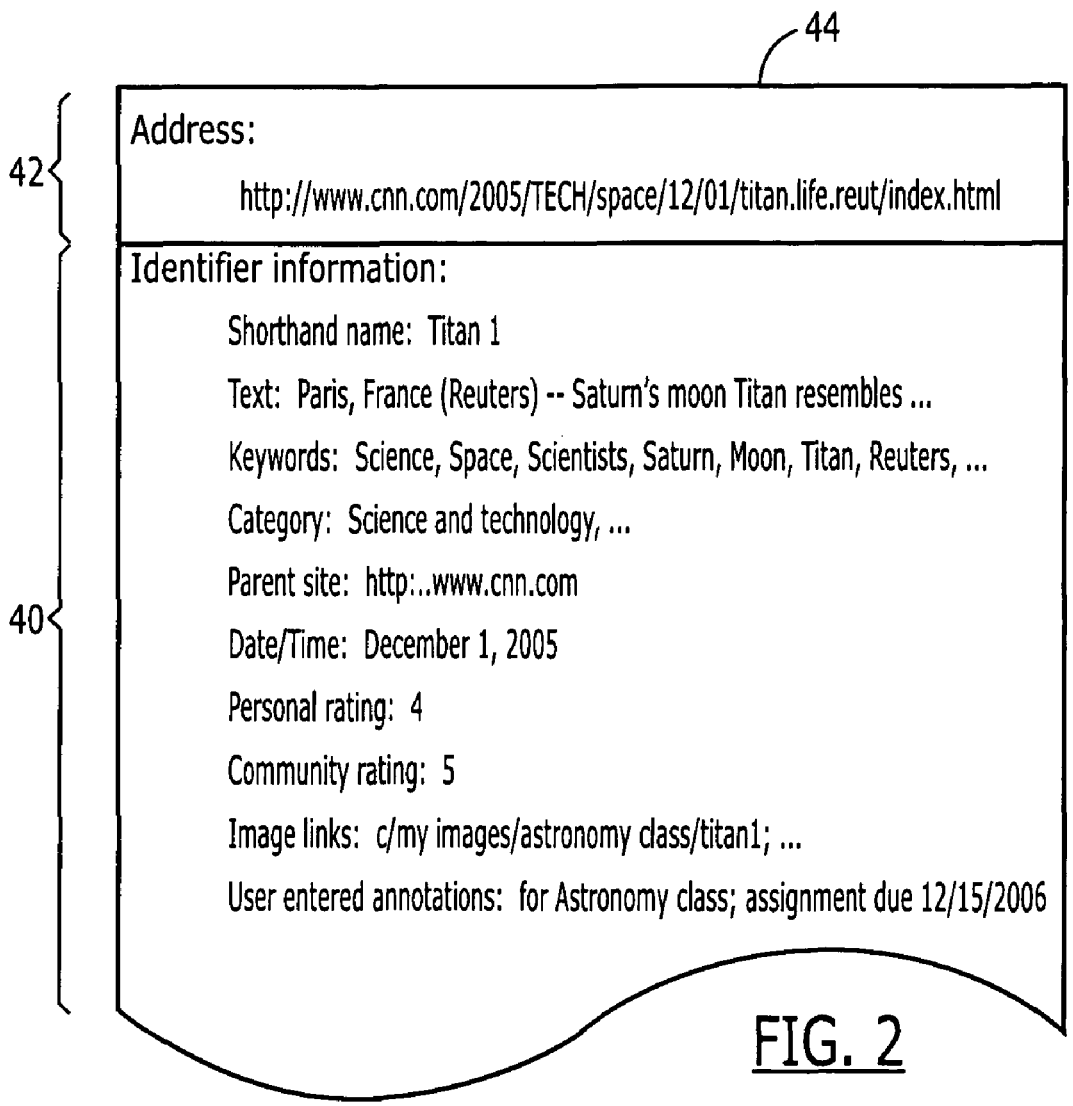
FIG. 2 is an illustration of a sample record of an intelligent bookmark according to an embodiment of the present invention.

Collectively, the details captured above are referred to as identifier information 40, and the address 42 and associated identifier information 40 are collectively referred to as an intelligent bookmark 44, as shown in FIG. 2 embodied as a database record. While the above has provided examples of certain identifier information, virtually any data which may be extracted from a document or added by a user may qualify as identifier information. Thus, the concept that an address has associated with it identifier information is not intended to be limited by the foregoing.

Figure 3:
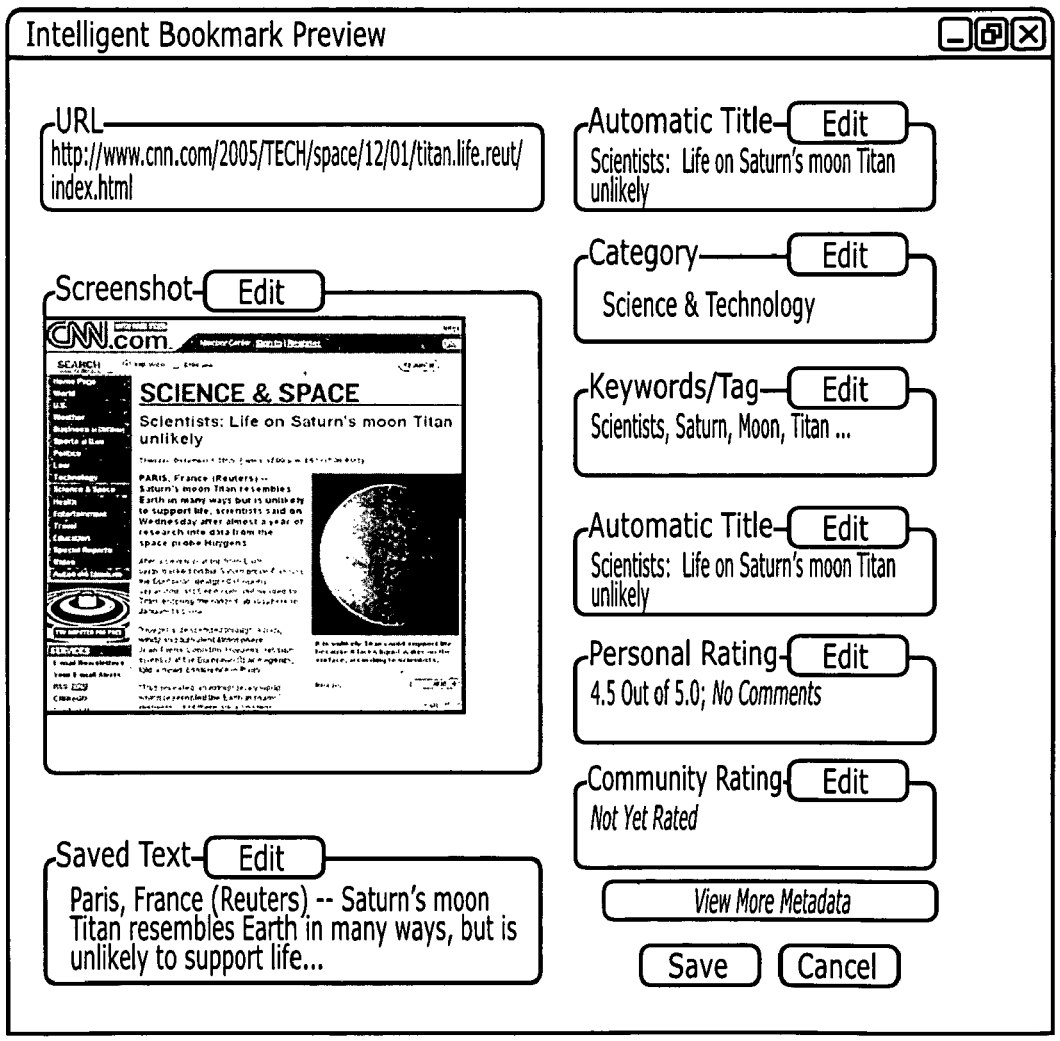
FIG. 3 is an illustration of a bookmark preview and editing user interface according to an embodiment of the present invention.

An intelligent bookmark 44 is typically stored in a data base, either on-line or off-line (discussed further below), which can interact with a user's browser software. FIG. 3 illustrates an interface 46 in which a user may create, view, edit, preview, etc. intelligent bookmarks. Based on preferences, the user interface 46 allows the user to edit the intelligent bookmark 44 by modifying, adding or deleting the various elements of the identifier information. For example, a user may create custom categorization and keywords, adding them to those automatically generated as identifier information discussed above, the user may decide if the taken screenshot/video capture adequately contains the content to be stored, etc.

This functionality can permit a user to fetch links as well. For example, a web page viewed by a user may itself contain multiple hyperlinks. In addition to bookmarking the viewed page, the user may be prompted to bookmark the pages pointed to by the hyperlinks. This is useful in cases where the user wants to gather information from a informative directory type page. Additionally, the user may right-click on a link (or take another similar action) to "fetch" that link, and "preview" how the link would look if the user accessed the page and were to bookmark it. Before the actual bookmarking, the user can preview the possible bookmarks of the hyperlinks one after another to decide which, if any, should be bookmarked. Based on this, the user can save the bookmark, open the bookmark to edit, visit the actual link to bookmark manually (screenshot/video capture), or discard the bookmark. Essentially the user is permitted to bookmark a page without accessing it manually, allowing the user to choose to bookmark selected links (with selected identifying information) present on a website being viewed. This allows the user to browse websites more efficiently, without having to visit pages in separate windows or pop-ups.

Figure 4:
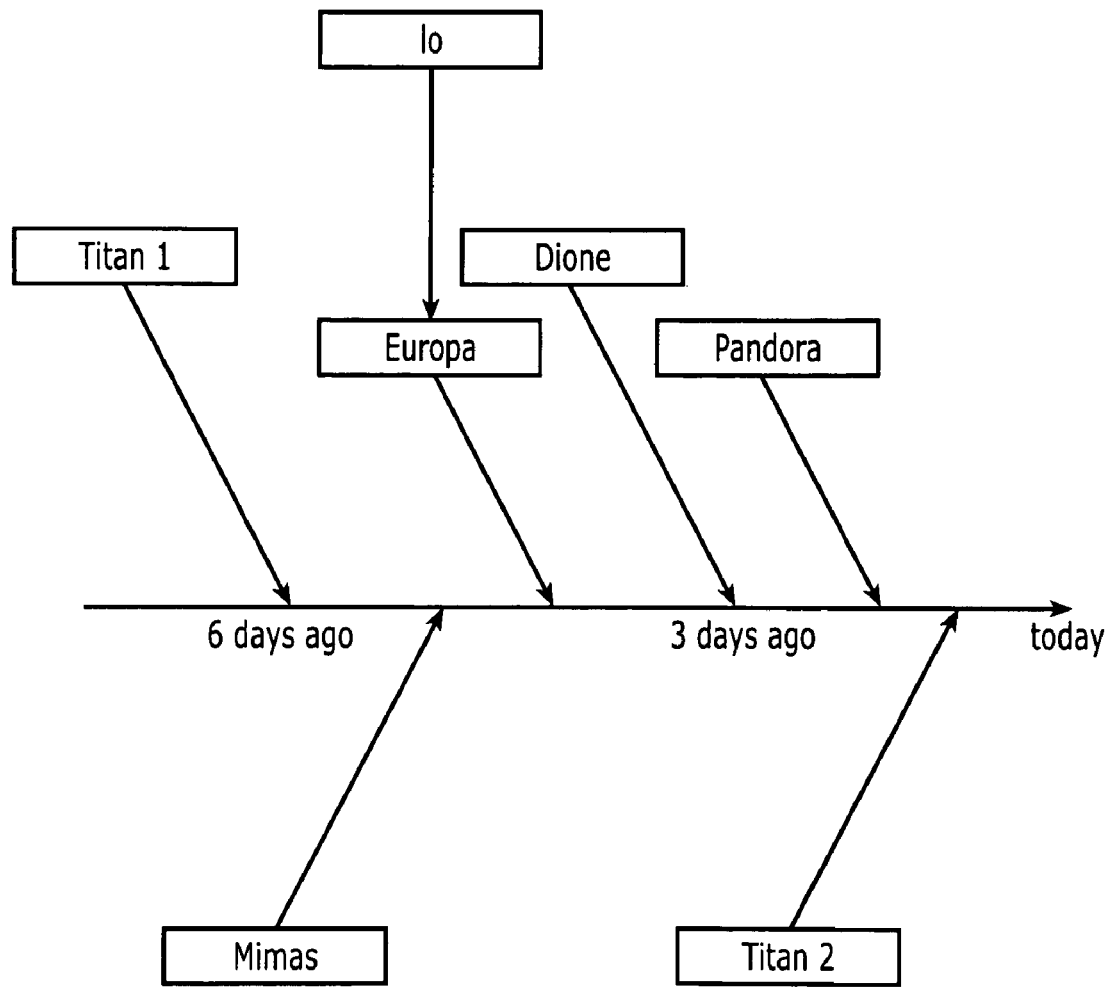
FIG. 4 is an illustration of a timeline presentation of intelligent bookmarks according to an embodiment of the present invention.

A user can easily search through and sort intelligent bookmarks based on identifier information 40. For example, the text/html 14 captured in the intelligent bookmark 44 may be searched. Additionally, users may sort and group links based on categories 30, or websites (e.g., parent website 20). Users can also search and sort intelligent bookmarks by the frequency they have been visited or the time frame of those visits. The time frame/frequency of the visits is the number of times the user accesses the bookmark/visits the URL after the bookmark has been created. The time of creation would be a time-stamp of the bookmark. Users can view intelligent bookmarks in a time-line type display, illustrated in FIG. 4 which sorts bookmarks based on the data and time stamp on the bookmark (for example filtered by a keyword, bookmark rating, etc.)

Figure 5A:
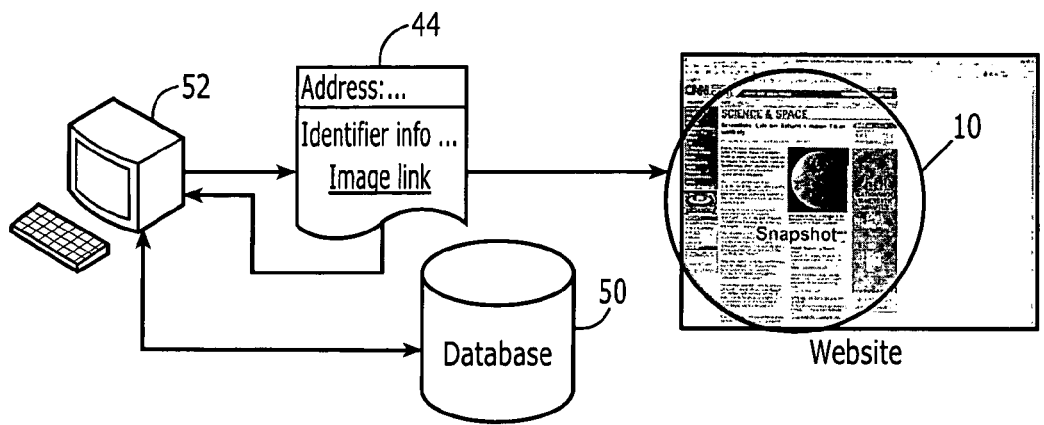
FIGS. 5A and 5B are illustrations of off-line (local) and on-line (server) models, respectively, of a system according to an embodiment of the present invention.
Figure 5B:
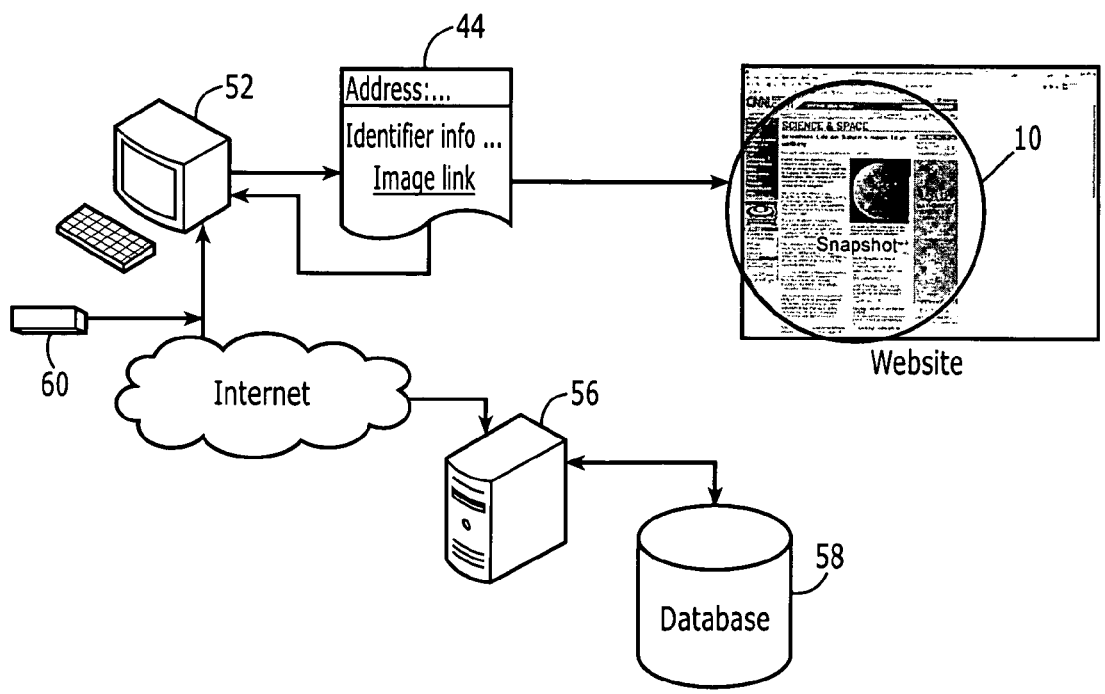

Once created, an intelligent bookmark can be saved and accessed offline, FIG. 5A, or online, FIG. 5B. In the offline software model shown in FIG. 5A, a bookmark database 50 resides directly on the user's computer 52. The user can access intelligent bookmarks stored directly on his or her computer 52. By being on the user's machine, the software accessing the intelligent bookmarks would be able to execute commands and process information quickly without network latency. In the online model shown in FIG. 5B, the user's computer 52 is connected to a remote server 56. The bookmark database 58 resides on the server 56. The software itself may be operating system-independent, allowing it to reside on a separate device 60 such as a portable USB device, an mp3 player or a Bluetooth enabled device. An application that does not depend on the computer's operating system directly can be portable, which allows the user the option of running it on a computer that does not have the software installed or available, such as a borrowed or public computer. This way, a user may have access to intelligent bookmark information from a number of sources, local, remote or a combination of the two.

Based on the device, the user can choose what resolution in which to access bookmarks or bookmark metadata. That is, a bookmark may be presented differently depending on the platform from which it is accessed. For example, accessing an intelligent bookmark via a mobile device such as a smart phone, the URL and a small version of the screenshot is likely all that would be desired or prudent to display. Yet accessing that same bookmark on a powerful, networked desktop PC may produce a high resolution, large format screenshot as well as a number of identifier information items.

Knowing the type and capabilities of the device accessing a bookmark may also permit certain specific tool behavior. For example, knowing that a bookmark is being accessed from a smartphone may cause the bookmark to be displayed with easily identified phone numbers, one-touch dialing of those phone numbers, etc. Therefore the type of presentation and operational logic for bookmarks may depend upon the interface device. This also means that the information captured and stored as part of the intelligent bookmark can anticipate specific device types, and the various access formats can be preset, allowing fast access of such information without further burdening computing time with reformatting display formats, etc.

In the online server model, the user's computer 52 could run a pre-installed software application that communicates with the server 56 to access the remotely stored intelligent bookmark database 58. Other embodiments may include plug-ins, toolbars or flash-based applications that could run on the user's computer 52 (such as in conjunction with a web browser application) allowing communication with the online server 56. The user can access an interface to view, add or modify the intelligent bookmarks. This feature allows for users to easily have files accessible from the internet for later use.

Intelligent bookmarks on the server 56 may easily be interlinked based on category, keywords, ratings, and other metadata. Essentially, users form directories or run queries to view similar intelligent bookmarks. Recommendation technologies, such as disclosed in U.S. Pat. No. 7,113,917, U.S. Pat. No. 6,266,649, and U.S. Pat. No. 6,064,980, each incorporated herein by reference, would be a way (when applied to bookmarks) to conceptually relate bookmarks for recommendations. The server (or an element of the db management software) may also prevent duplicate intelligent bookmarks. In such cases, when users want to contribute information to the bookmark, ratings, keywords, articles, pictures, video, similar websites, and other information may be contributed. Besides the identifying information 40, other relevant metadata such as the member's location and other geographical factors may be used to group or categorize Intelligent Bookmarks.

A combination of the offline (FIG. 5A) and online (FIG. 5B) model may be utilized, allowing the user to synchronize the offline data base 50 and online database 58. Since server database 58 can be accessed from a network, a user may be provided a degree of flexibility in accessing the intelligent bookmarks.

Figure 6:
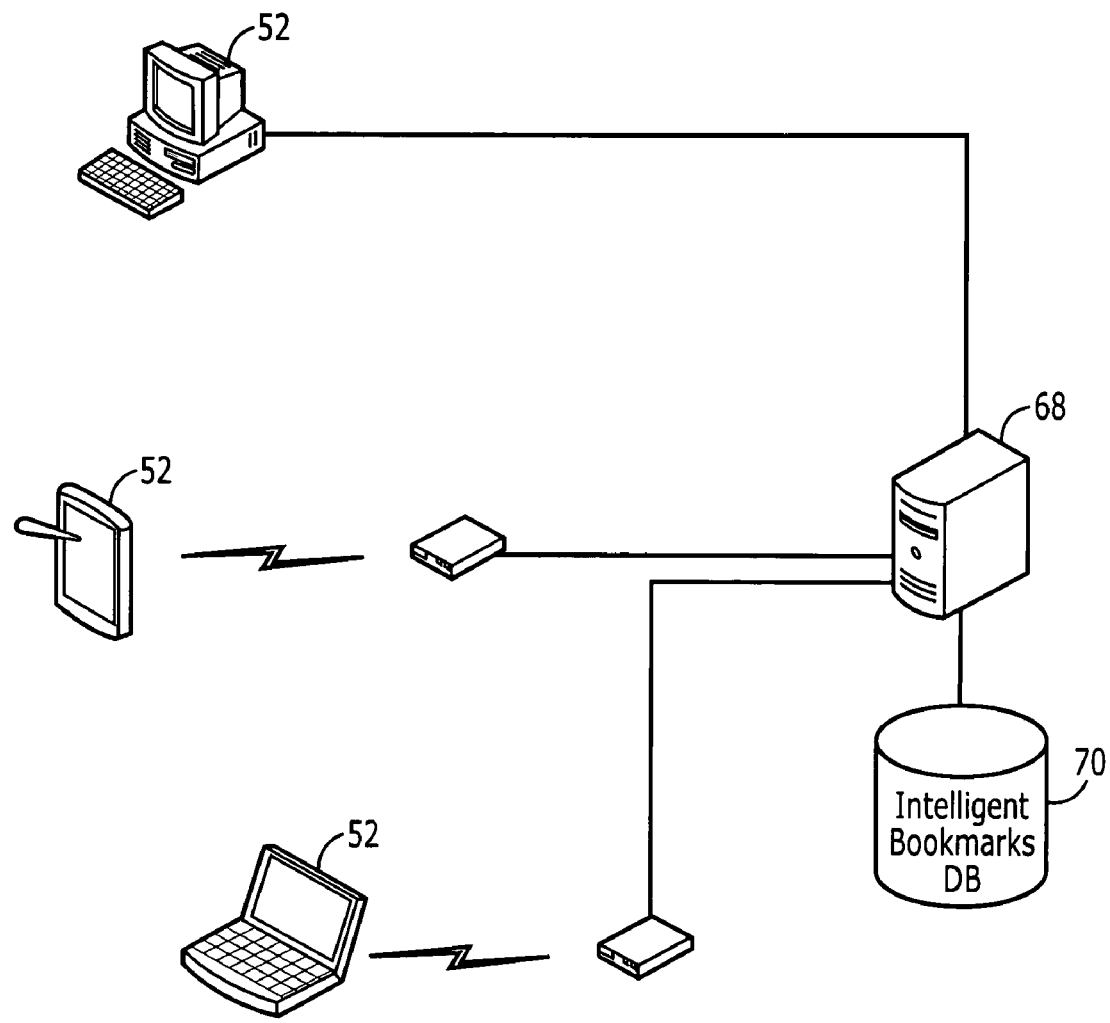
FIG. 6 is an illustration of a community-user model of a system according to an embodiment of the present invention.

Referring now to FIG. 6, an on-line model in which a number of users 62, 64, 66 are in communication with a server 68, which is in turn in communication with intelligent bookmark database 70, is illustrated. In such a model, a community of users may share, edit, add, etc. individual intelligent bookmarks or collections of intelligent bookmarks. For example, a user 66 can initiate access to intelligent bookmarks stored in database 70 through use of a community portal (software, not shown) resident on server 68. User 66 can then search, browse, copy, follow links in, etc. the intelligent bookmarks stored in database 70. Each intelligent bookmark in database 70 can include properties allowing a creator of such a bookmark to permit or deny third parties from editing or deleting the bookmark once stored. User 66 may contribute to a community rating 36 of the intelligent bookmarks in database 70 according to a rating system, designed for example to help users quickly narrow a search to relevant material. In searching by keywords, metadata, dates, ratings, etc., URLs of sites others have found relevant to a topic are more efficiently and quickly identified. A user may then follow the URLs to the underlying document or site at which the information the user seeks will likely be found. The interlinked intelligent bookmark system present on a community server thus facilitates finding information through the use of the stored intelligent bookmarks. By incorporating appropriate filters, the community server can also ensure that spam and other harmful items do not reach the server, for example based on examining the individual intelligent bookmarks and the URLs to which they point. Furthermore, the community server can track whether links are alive and mark bookmarks as obsolete, current, new, etc. While the community aspect of the present invention is, in one sense, an adjunct to traditional web searches, the community server may itself have search engine type technology to make searches for intelligent bookmarks very efficient.

Intelligent bookmarks can be set to automatically expire or be archived from their database (e.g., 50, 58). Users may be prompted before such expiration or archiving depending on set preferences. Archiving or deleting old bookmarks or non-relevant bookmarks preserves the wealth of information in the offline or online database 50, 58.

Figure 7:
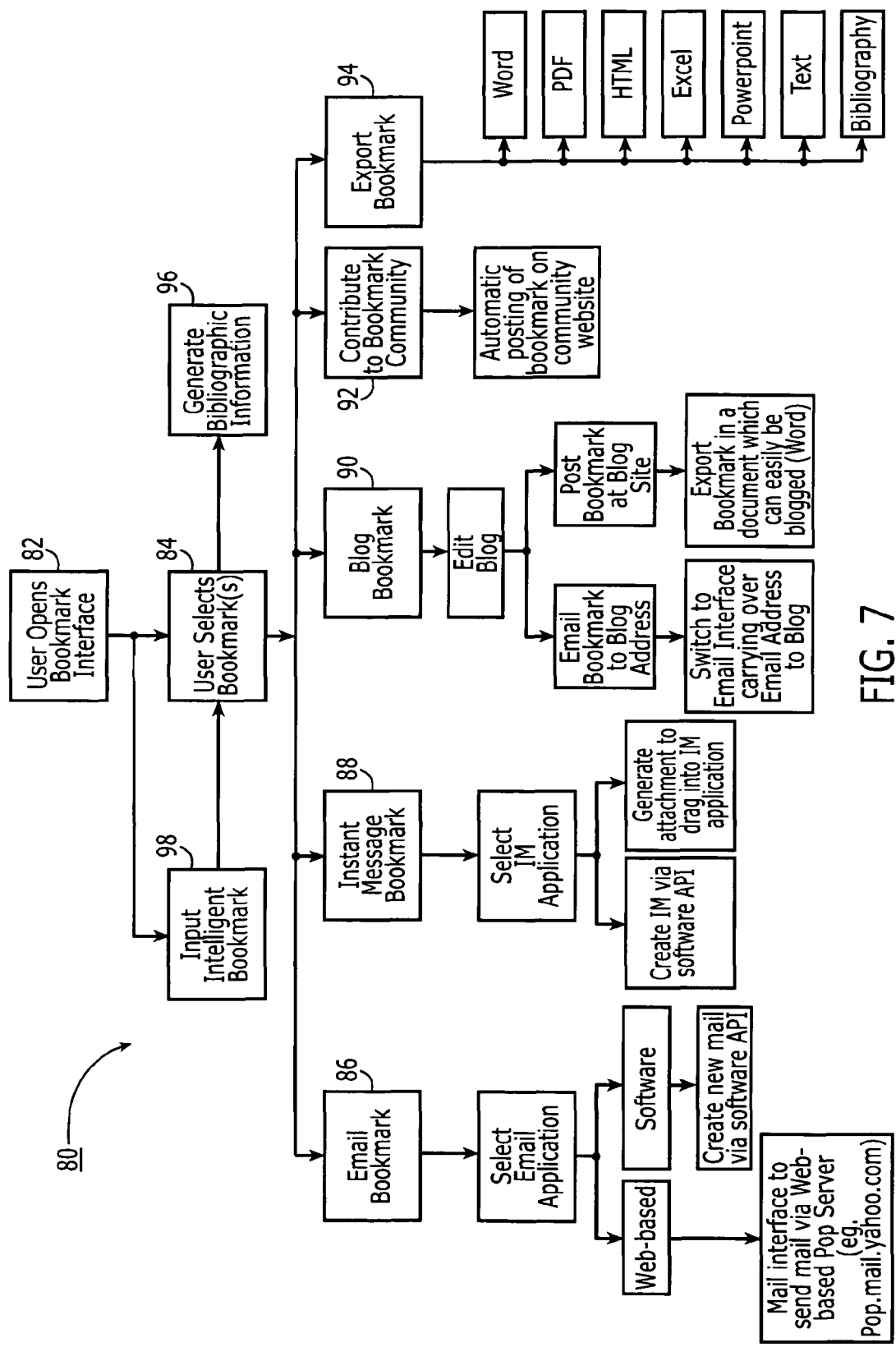
FIG. 7 is an illustration of a process by which a user can share an intelligent bookmark with others according to an embodiment of the present invention.

FIG. 7 presents process 80 by which a user can share an intelligent bookmark with others. Sharing is typically initiated at step 82 from within an interface through which a user may interact with the intelligent bookmarks. Once a user selects one or more intelligent bookmarks to share at step 84, the user can export, share, publish or select from a number of other sharing options as follows. The user interface will typically control converting the bookmark into an appropriate format, so that a user can most easily select the appropriate sending option. While in the following we refer to the sending of an intelligent bookmark, it will be understood that the actual item delivered may be the database record representing the intelligent bookmark, a pointer to the database record located on a server or networked computer, or a combination of the two.

First, an intelligent bookmark can be sent by e-mail at 86 to a user-specified address. The bookmark may be an attachment to the email message or may be a portion of the email note itself.

An intelligent bookmark can be sent using instant messaging at 88. Intelligent bookmarks can either be directly instantly messaged to another, or the bookmark can be inserted as an attachment.

An intelligent bookmark can be sent using a web log (blog) system at 90. Users can create the blog post within their bookmarks. For example, a user could comment on the selected bookmarks as they would do in a blog. This blog entry could be stored on the bookmarks as well in another metadata category. The bookmark can be activated by an html script, or by cutting and pasting into the online blogging interface provided by the blog provider. This way, users can share their blog with comments and attach the bookmarks to the post.

An intelligent bookmark may be shared through internet communities at 92, as previously discussed. Again, there is significant value in providing intelligent bookmarks to an appropriate networked community, with its members able to search, rate, add to, etc. those bookmarks. The server software will typically control the uploading of bookmarks online, such as to the community database. There may be links from the community bookmark to individual bookmarks depending on whether or not the user wants the bookmark to be accessible after updates or deletion. The community may allow users to have automatic ratings of bookmarks and to find similar bookmarks based on topics, categories, etc. Intelligent bookmarks may include private data and public data, and the creator of such intelligent bookmarks provided with the ability to control third party access to the private data.

An intelligent bookmark can also be exported, from a client machine or a server, and saved as other types of documents at 94. For example, a bookmark can be saved in the form of a Word, Excel, Powerpoint, PDF, html or some other document tool or other standard.

Once a user selects one or more intelligent bookmarks at 84 the user may also generate bibliographic information at 96 based on the identifier information. The bibliography or other useful reference information can be easily copied and pasted into other documents. This simplifies the use of bibliographic and reference data from a bookmark.

Users may also import information into their bookmark database at 98. While a typical intelligent bookmark interface will permit fetching URLs from a file and generating identifier information therefrom, users may also import intelligent bookmarks from the community or other users. Intelligent bookmarks may be downloaded, received via IM or Email, taken from a blog, or manually copied from storage media.

Figure 8:
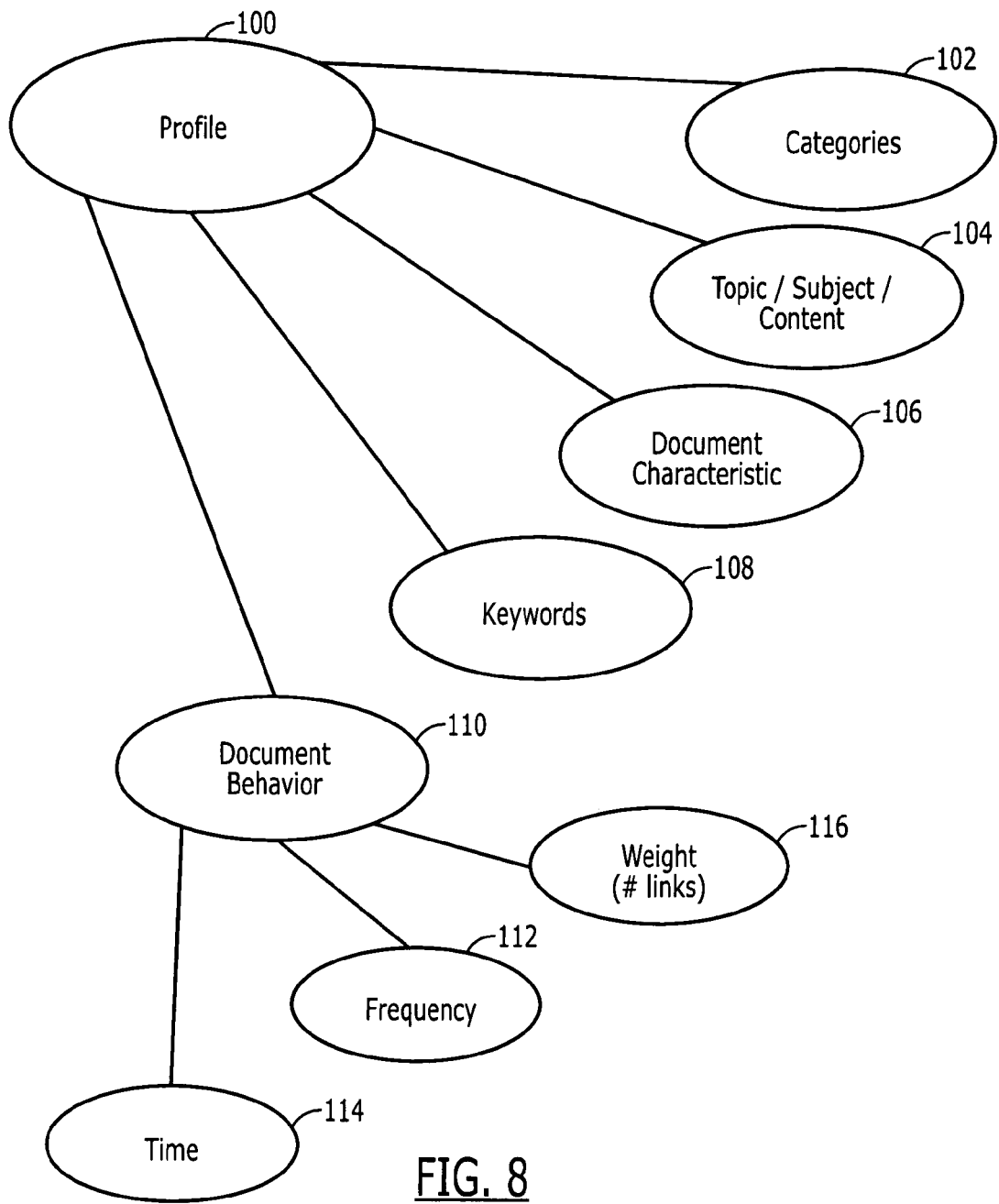
FIG. 8 is an illustration of the elements of a user profile created from a population of intelligent bookmarks according to an embodiment of the present invention.

Information from intelligent bookmarks within a user's database can be used to create a user profile 100 as shown FIG. 8. This type of profile generation does not require user accounts to be created and the profile generated can be nonpersonal material. FIG. 8 shows some of the areas from which a user profile is developed. Different categories 102, topics 104, and keywords 108 listed in the user's bookmarks can provide insight into which areas are of interest to the user. Based on the interaction with the user's bookmarks, such as the frequency of visit which is captured at 112 and time spent which is captured at 114, a count of the number of types of links (e.g., a weighting factor) captured at 116, and other data, behavior data 110 may be generated. Also, any specific characteristics 106 of the websites bookmarked can be further informative of the user profile. The information available from the user's bookmark database may be analyzed by the server and compared to other databases to derive certain conclusions on generating a user profile. Profile information may also be manually set or controlled by users.

Once a user profile 100 is created, the user can be notified of internet websites and advertisements that might be of interest to the user. Having a user profile makes it very easy for users to get suggestions to topics of interest from the community in an effective manner. In an embodiment, there may be a browsing companion (e.g., a plug-in software module) on the user's browser which can offer similar website and topics the user can browse based on his/her profile. As with topics of interest, advertisements and other sponsored material may be sent to users in a non-intrusive manner by the browsing companion. The user receives such targeted ad information from the server which combines user profile information with current browsing or bookmark information. This would allow for more location and demographic based advertisements as well.

Figure 9:
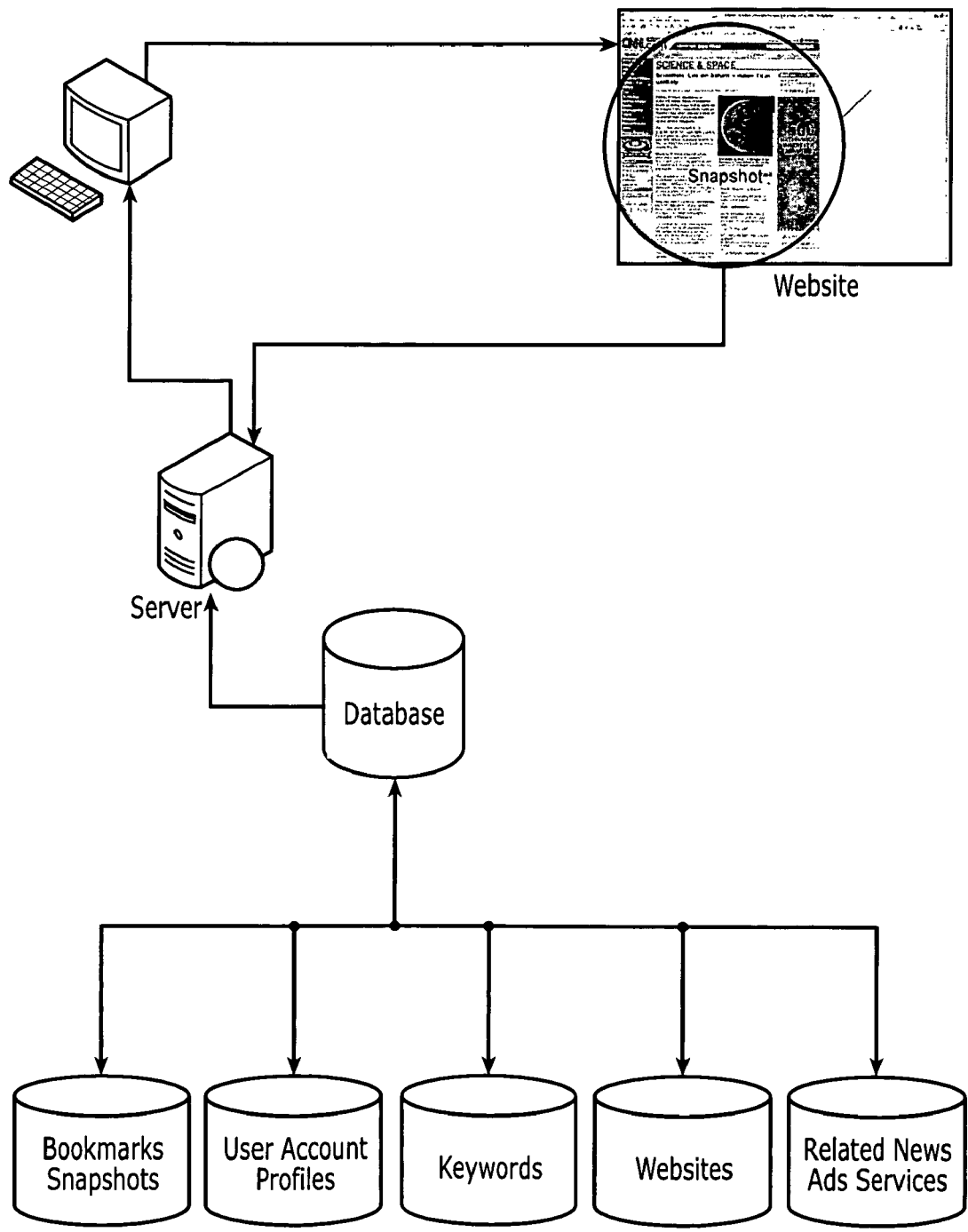
FIG. 9 is an illustration of a process for automatically assigning a category to an intelligent bookmark by referencing other databases that may reside remotely or on a user's computer according to an embodiment of the present invention.

FIG. 9 depicts one embodiment according to the present invention of how a category can automatically be assigned to an intelligent bookmark by referencing other databases that may reside remotely or on a user's computer. These various databases may contain keyword ratings and categories, website ratings and categories, advertisement indexes, etc., and may be updated periodically for improvement, accuracy, content, etc. Depending on the embodiment, this metadata may be gathered from other third-party sources as well which may interface with the intelligent bookmark for purposes of categorization, organization and other functionalities. That is, it is possible to provide recommendations, narrow searches, and provide other services based on extrinsic data. By accessing this extrinsic data, one can use existing relational information to provide categorization, organization, recommendations, etc., of or for information. For example, if a third party maintains a database that says that most people that like blues music will like jazz as well, this third party (i.e., extrinsic) knowledge can help associate bookmarks or underlying information about blues with bookmarks or underlying information about jazz. As another example relating to articles, there may be a automatic categorization based on extrinsic categorization of frequently available keywords. If an article mentions "C++" and other sites frequently categorize C++ as Science & Technology→Computers, the system could employ that as a "suggestion" to similarly categorize that topic.

Figure 10:
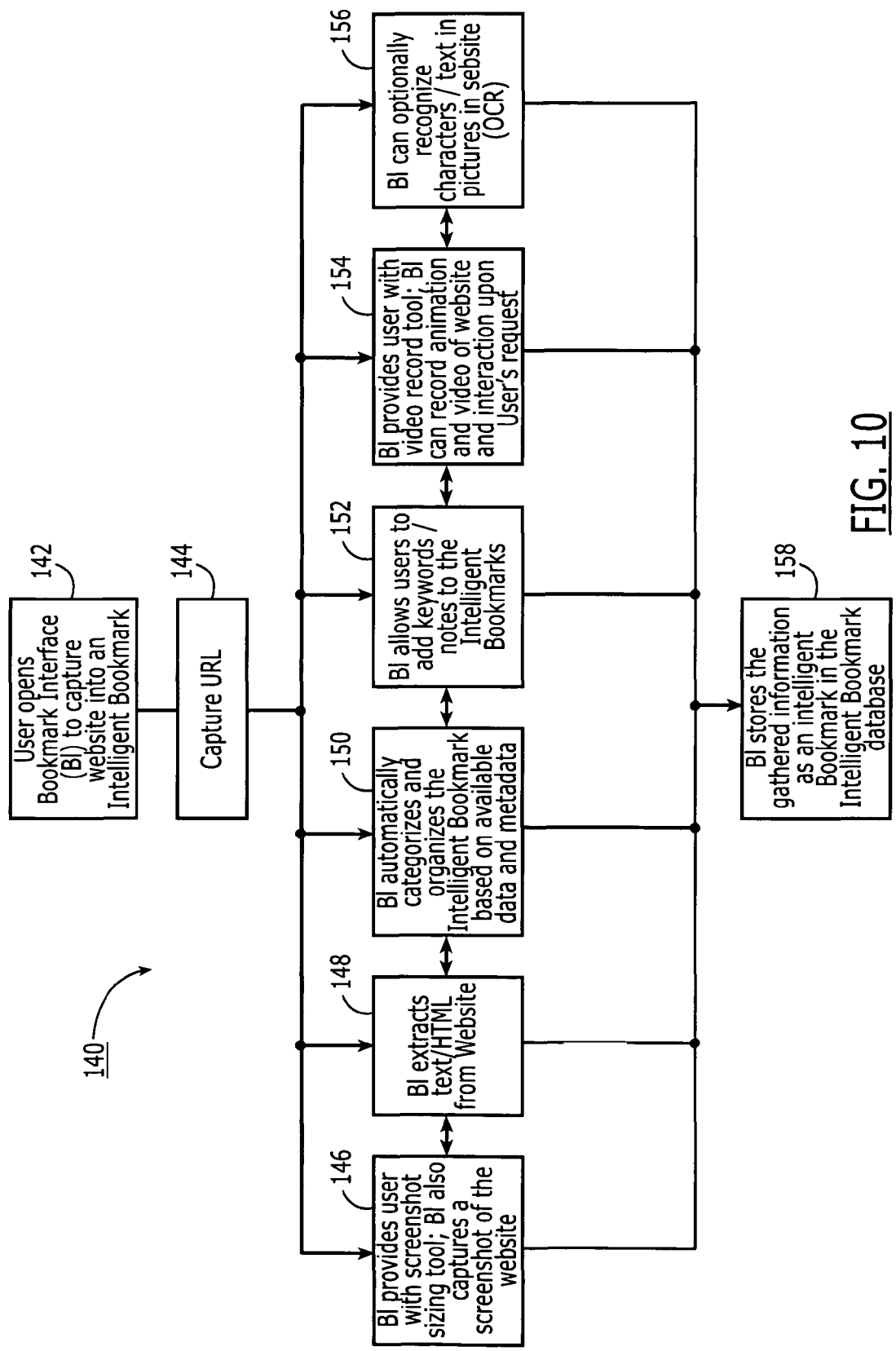
FIG. 10 is an illustration of a process for creating an intelligent bookmark according to an embodiment of the present invention.

FIG. 10 depicts one embodiment according to the present invention of how an intelligent bookmark is created. A user begins the process 140 of creating an intelligent bookmark by accessing a bookmark interface (BI) at 142. The bookmark interface may be a stand-alone software program or may be part of another program, such as a web browser application. The bookmark interface may reside on the user's computer, or may be resident on a remote server. At 144 the bookmark interface captures the URL of the website or document of interest. At 146-156 the identifying information is obtained. For example, at 146 the user may capture certain elements of the screenshot of the page of interest with a selection tool provided by the interface. A user may then drag-and-drop the selection to a desired location, representing for example storage of those selected image or image portions. Users may also be able to use pull-down menus to create the intelligent bookmark. Additionally, the browser may include a tool bar or button that automatically creates a fixed or customizable bookmark for a particular web page. Other drag-and-drop functionalities may assist the user in changing the metadata or data fields of the Intelligent Bookmarks. Users may drag-and-drop bookmarks from certain categories to others to have the data fields automatically reflect such changes. The bookmark interface may provide for timeline views which let a user see bookmarks chronologically, and slideshow view which allows a user to see bookmarks as a slideshow.

In addition or as an alternative to drag and drop abilities and menu commands, the user may capture information via capture tools. Image selecting and cropping tools may be available for user's to highlight which area of the website should be in the screenshot. While default settings may simply capture as much information as possible and automatically recognize the important information of the webpage (distinguish between menu items, advertisements, article content, etc.), a user may use selecting and cropping tools to highlight only certain text to be captured (or to be ignored, such as certain images, advertisements, etc.)

Intelligent bookmarks may also be used within documents and internet content that may be on the user's computer (not within a browser window). This is grounded in the concept that a bookmark need not necessarily be to a web page, or even a networked document, but may in fact be the address of a local document or portion of a document. This allows a user to capture and store various content through one interface, making it easy to deal with gathering information. A tool such as a capture button is provided within the context of an application such as Microsoft Word. The user bookmarks content within the word document, for example by highlighting a section of the document and clicking on the capture button, which stores the bookmark to the highlighted section in the bookmarks database. This permits a user the option of capturing information while reviewing many different types of document, such as word processing documents, data bases, spreadsheets, etc.

As previously mentioned, according to one embodiment of the present invention a system for creating and employing intelligent bookmarks includes a "record" functionality that allows the user to capture interactions and video/animation content as a video screenshot. This type of capturing functionality allows a user to bookmark video and dynamic content in addition to articles and other static elements of websites.

Another type of capturing interface, such as a submit button, allows users to submit bookmarks to an online server to be processed remotely. Once submitted, a server may analyze the website for categorization, keywords, etc and store it in the online database.

Layering may also be added to intelligent bookmarks, such as present in image and video editing applications. For example, it is possible to annotate an intelligent bookmark with handwriting or highlighting on a "layer" above the bookmark itself, such that the addition of the annotation does not change the underlying bookmark. A view of the bookmark with or without one or more layers is possible. This layering allows users to collaborate on Intelligent Bookmarks as well. Being able to markup information gathered from the internet in a digital version (as opposed to printed material) allows users to interact more efficiently with research material. Such layering, highlighting, and markup allow some of the unique aspects of tablet PCs and PDAs, such as pen-based interactions with content, to be employed. Essentially, users are able to treat internet content as printed material by being able to easily markup and highlight the material. Being digital, however, allows users all the functionality of being to hide/save/undo changes and easily communicate them to others. Document versioning may also be integrated to keep track of changes in the intelligent bookmarks to reflect changes of the original website. Also, document versioning may be used to allow for multiple versioning of highlights and markups to the intelligent bookmarks.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, while the foregoing describes certain aspects of creating, using, sharing, etc. intelligent bookmarks via a computer such as a PC, there is nothing in the various aspects of the present invention precluding its use with portable or hand-held devices such as tablet computers, personal digital assistants (PDAs), and appropriately enabled cell phones. Thus, the foregoing detailed description provides those of ordinary skill in the art with a convenient guide for implementation of the invention, and contemplates that various changes in the functions and arrangements of the described embodiments may be made without departing from the spirit and scope of the invention defined by the claims thereto.

What is claimed is:

1. A computer-implemented method for creating an intelligent bookmark to a document, the document of the type including at least an address, a title, and a body, the intelligent bookmark including at least an address of a document, identifier information and user supplemented information about that document obtained at least in part from the body of the document, comprising:
   displaying the document;
   receiving a user selection of content from a portion of the body of the document;
   retrieving the address of the document;
   extracting certain identifier information from the body of the document within the user selection
   receiving user supplemented information from the user comprising video related to the document; and
   storing said address and said certain identifier information such that said address and said identifier information are associated with one another so that the document can be accessed from the address and information about the document can be obtained from the identifier information.

2. The method of claim 1, wherein said step of extracting certain identifier information from the body of the document takes place automatically, without requiring specific user input.

3. The method of claim 2, wherein the user supplemented information also includes information selected from the group consisting of:
   rating, summary, notes, date, keywords, and title.

4. The method of claim 2, wherein said automatic extraction includes automatically identifying and extracting text information from the document.

5. The method of claim 2, wherein said automatic extraction includes automatically performing optical character recognition on the document, and extracting text from the results of the optical character recognition.

6. The method of claim 2, wherein said automatic extraction includes automatically identifying at least one keyword from the body and adding that keyword to the identifier information.

7. The method of claim 2, wherein said automatic extraction includes automatically identifying at least one category for the document from the body and adding that category to the identifier information.

8. The method of claim 2, wherein certain information is automatically excluded, based on its characteristics, from the identifier information.

9. The method of claim 8, wherein said certain information is advertisement information.

10. The method of claim 2, wherein said automatic extraction includes automatically identifying an image in the body and creating a link to the image.

11. The method of claim 1, wherein the extracted identifier information includes metadata.

12. The method of claim 11, wherein the metadata includes at least one element selected from the following: description, author, section, subsection, keywords, content type, referring URL, forms, formatting data, file location, encoding/decoding data, and size.

13. The method of claim 1, wherein said document is an Internet web page, and further wherein said identifier information includes the search history leading to the display of the Internet web page.

14. The method of claim 1, further including the steps of:
   searching for extrinsic data relating to the document; and
   including selected elements of such extrinsic data in said identifier information.

15. The method of claim 1, wherein said association between said address and said identifier information permits a search of said identifier information in order to obtain said address.

16. The method of claim 1, further comprising the steps of:
   capturing user interactions with a computing device on which said document is displayed; and
   including information about said user interactions in said identifier information.

17. One or more non-transitory computer-readable media storing computer-executable instructions for performing a method of creating an intelligent bookmark to a document, the document of the type including at least an address, a title, and a body, the intelligent bookmark including at least an address of a document and identifier information about that document obtained at least in part from the body of the document, comprising:
   displaying the document;
   receiving a user selection of content from a portion of the body of the document;
   retrieving the address of the document;
   extracting certain identifier information from the body of the document within the user selection; and
   storing said address and said certain identifier information such that said address and said identifier information are associated with one another so that the document can be accessed from the address and information about the document can be obtained from the identifier information.

18. A computer-implemented method for creating an intelligent bookmark to a document, the document of the type including at least an address, a title, and a body, the intelligent bookmark including at least an address of a document, identifier information and user supplemented information about that document obtained at least in part from the body of the document, comprising:

displaying the document;

receiving a user selection of content from a portion of the body of the document;

retrieving the address of the document;

extracting certain identifier information from the body of the document within the user selection capturing video of user interactions with a computing device on which said document is displayed; and storing said address and said certain identifier information such that said address and said identifier information are associated with one another so that the document can be accessed from the address and information about the document can be obtained from the identifier information.

* * * * *